United States Patent
Schwaderer et al.

(10) Patent No.: US 10,704,697 B2
(45) Date of Patent: Jul. 7, 2020

(54) BYPASS VALVE FOR EXPANSION MACHINE

(71) Applicant: Robert Bosch GmbH, Stuttgart (DE)

(72) Inventors: Peter Schwaderer, Wildberg (DE); Benjamin Schweizer, Horb (DE); Frank Scholz, Stuttgart-Feuerbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/336,979

(22) PCT Filed: Aug. 22, 2017

(86) PCT No.: PCT/EP2017/071133
§ 371 (c)(1),
(2) Date: Mar. 27, 2019

(87) PCT Pub. No.: WO2018/059835
PCT Pub. Date: Apr. 5, 2018

(65) Prior Publication Data
US 2019/0219180 A1    Jul. 18, 2019

(30) Foreign Application Priority Data
Sep. 29, 2016   (DE) .................. 10 2016 218 834

(51) Int. Cl.
*F16K 11/10*    (2006.01)
*F16K 15/04*    (2006.01)
(Continued)

(52) U.S. Cl.
CPC .......... *F16K 11/105* (2013.01); *F16K 11/044* (2013.01); *F16K 11/056* (2013.01); *F16K 15/044* (2013.01)

(58) Field of Classification Search
CPC ..... F16K 11/105; F16K 11/044; F16K 11/056
(Continued)

(56) References Cited

U.S. PATENT DOCUMENTS 3,559,678 A * 2/1971 Donner ................. F16K 15/044
                                                                137/535
3,967,635 A * 7/1976 Sealfon ............... B01F 3/04815
                                                                137/102
(Continued)

FOREIGN PATENT DOCUMENTS

DE          3800807         8/1989
DE      102014224979        6/2016

OTHER PUBLICATIONS

International Search Report for Application No. PCT/EP2017/071133 dated Jan. 26, 2018 (English Translation, 2 pages).

*Primary Examiner* — Angelisa L. Hicks
(74) *Attorney, Agent, or Firm* — Michael Best & Friedrich LLP

(57) ABSTRACT

The invention relates to a bypass valve (1), in particular for an expansion machine (104) of a waste heat recovery system (100). The bypass valve (1) has a housing (2) with a valve chamber (9) formed therein. An inlet (3), an expander outlet (4) and a bypass outlet (5) are formed in the housing (2), which feed into the valve chamber (9). A closing element (6) is moveably arranged in the valve chamber (9). A valve seat (11) is formed on the housing (2). The closing element (6) cooperates with the valve seat (11) in order to open and close a first hydraulic connection from the inlet (3) to the expander outlet (4). A control valve (8) opens and closes a second hydraulic connection from the inlet (3) to the bypass outlet (5). The control valve (8) forms a first throttle point (21) in an open position. A second throttle point (22) is arranged between the valve chamber (9) and the bypass outlet (5). The control valve (8), the second throttle point (22) and the closing element (6) border a control chamber (9a). The first throttle point (21) has a greater flow cross-section than the second throttle point (22).

12 Claims, 2 Drawing Sheets

(51) Int. Cl.
*F16K 11/056* (2006.01)
*F16K 11/044* (2006.01)

(58) Field of Classification Search
USPC .................. 137/513, 513.3, 513.5, 513.7
See application file for complete search history.

(56) References Cited

U.S. PATENT DOCUMENTS

| | | | | |
|---|---|---|---|---|
| 5,791,317 | A * | 8/1998 | Eck | ................ F02M 37/025 |
| | | | | 123/510 |
| 2005/0150207 | A1* | 7/2005 | Christensen | .............. F02K 1/44 |
| | | | | 60/229 |
| 2007/0088216 | A1* | 4/2007 | Pfeiffer | ................ F16K 15/028 |
| | | | | 600/468 |
| 2010/0062890 | A1* | 3/2010 | Shimizu | ................ F15B 11/05 |
| | | | | 475/161 |

* cited by examiner

BYPASS VALVE FOR EXPANSION MACHINE

BACKGROUND OF THE INVENTION

The invention relates to a bypass valve for an expansion machine, especially for a turbine of a waste heat recovery system of an internal combustion engine.

Valves are known in a wide variety of embodiments from the prior art. A known bypass valve for an expansion machine is known for example from unexamined German application DE 10 2014 224 979 A1. The known bypass valve comprises a housing with a valve chamber formed therein. Formed in the housing are an inlet, an expander outlet and a bypass outlet, which open into the valve chamber. A closing body is movably arranged in the valve chamber. A valve seat is formed in the housing. The closing body interacts with the valve seat for the opening and closing of a first hydraulic connection from the inlet to the expander outlet. A control valve opens and closes a second hydraulic connection from the inlet to the bypass outlet. In an open position, the control valve forms a first restriction point. A second restriction point is arranged between the valve chamber and the bypass outlet.

Such valves are the subject of ongoing further developments, particularly with regard to robustness and cost savings.

SUMMARY OF THE INVENTION

The bypass valve according to the invention, particularly for use for an expansion machine of a waste heat recovery system, is of a particularly inexpensive and robust design.

To this end, the bypass valve comprises a housing with a valve chamber formed therein. Formed in the housing are an inlet, an expander outlet and a bypass outlet, which open into the valve chamber. A closing body is movably arranged in the valve chamber. A valve seat is formed in the housing. The closing body interacts with the valve seat for the opening and closing of a first hydraulic connection from the inlet to the expander outlet. A control valve opens and closes a second hydraulic connection from the inlet to the bypass outlet. In an open position, the control valve forms a first restriction point. A second restriction point is arranged between the valve chamber and the bypass outlet. The control valve, the second restriction point and the closing body delimit a control chamber. The first restriction point has a larger flow passage cross section than the second restriction point.

By means of the controllable first restriction point and the second restriction point the pressure in the control chamber can therefore by varied. This pressure acts upon a region of the closing body so that on account of the pressure differences a movement of the closing body against the valve seat or away from the valve seat is carried out. The control valve in this case requires only very small actuating forces so that the bypass valve is energetically very favorable. Furthermore, the bypass valve is also more simple to produce and correspondingly more cost effective than a slide valve.

The closing body is preferably designed as a ball. As a result, wear of ball and valve seat is minimized. Accordingly, the functionality of the bypass valve is robust or its service life is increased as a result.

In advantageous developments, a spring acts upon the closing body in the direction of the valve seat. Depending on the dimensioning of the control chamber, valve seat and any additional restriction points, it is practical or even necessary to use a spring for assisting the hydraulic forces. This assisting can be carried out in the direction of the valve seat or away from this. The spring, however, is advantageously arranged in the valve chamber so that it acts in the direction of the valve seat since the valve seat is preferably arranged in a manner encompassing the expander outlet and is correspondingly exposed to action of the highest pressure in the system during expander mode. The bypass valve has to be able to close the first hydraulic connection against this pressure; this takes place by means of assistance by the spring force.

In advantageous embodiments, with the first hydraulic connection closed, a third restriction point is formed in the valve chamber between the closing body and the housing. As a result, the switching over from expander mode to bypass mode can be carried out more quickly since the control chamber can be filled more quickly with the pressurized fluid from the inlet.

The flow passage cross section through the third restriction point is in this case advantageously smaller than the flow passage cross section through the second restriction point. This is necessary in order to be able to switch from bypass mode to expander mode without additional assistance.

In an advantageous embodiment, the bypass valve according to the invention is arranged in a waste heat recovery system for an internal combustion engine. The waste heat recovery system comprises a circuit which conducts a working medium, wherein in the flow direction of the working medium the circuit comprises a pump, an evaporator, the bypass valve according to a previously described embodiment, an expansion machine and a condenser. A bypass line is arranged in parallel with the expansion machine, wherein the bypass valve controls the mass flow of the working medium to the expansion machine and to the bypass line. Consequently, the mass flow of the working medium can be optionally divided between the expansion machine and the bypass line. This can be carried out for example in dependence of the degree of evaporation of the working medium or the temperature of the working medium. Owing to the pressures in the condenser (approximately atmospheric pressure) and in the expansion machine (up to 50 bar), comparatively large pressure differences prevail, pressure differences are particularly advantageous for the functionality of the bypass valve according to the invention since the control chamber can therefore be loaded with correspondingly different pressures.

DETAILED DESCRIPTION

Figure 1:
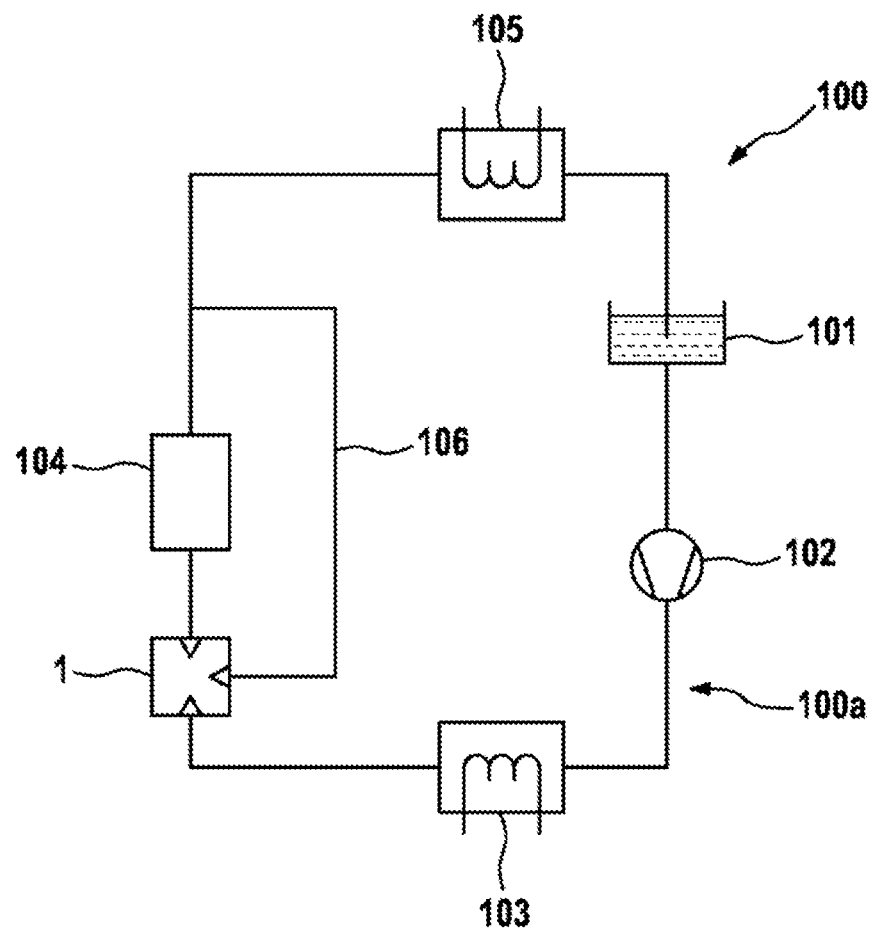
FIG. 1 schematically shows a waste heat recovery system from the prior art.

FIG. 1 shows a bypass valve 1 inside a waste heat recovery system 100 as the bypass valve for an expansion machine 104. The waste heat recovery system 100 has a circuit 100a, conducting a working medium, which in the flow direction of the working medium comprises a collecting tank 101, a pump 102, an evaporator 103, the bypass valve 1, an expansion machine 104 and a condenser 105. By means of the pump 102 liquid working medium is delivered from the collecting tank 101 into the evaporator 103 and evaporated there as a result of the thermal energy of an exhaust gas of an internal combustion engine, which is not shown. The evaporated working medium is then expanded in the expansion machine 104, releasing mechanical energy for example to a generator, which is not shown, or to a transmission, which is not shown. The working medium is then liquefied again in the condenser 105 and fed back into the collecting tank 101. A bypass line 106 is arranged in parallel with the expansion machine 104. The bypass valve 1 controls the mass flow of the working medium to the expansion machine 104 and to the bypass line 106. Such a waste heat recovery system 100 is known from the prior art.

Figure 2:
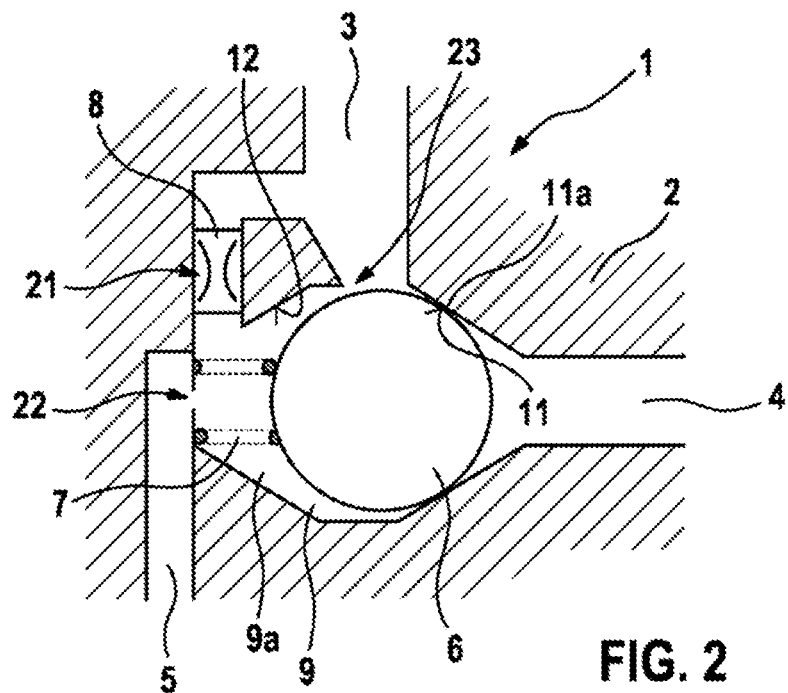
FIG. 2 shows a longitudinal section through a bypass valve according to the invention, wherein only the essential areas are shown.

FIG. 2 schematically shows in longitudinal section a bypass valve 1 according to the invention, wherein only the essential areas are shown. The bypass valve 1 comprises a housing 2 in which are formed an inlet 3, an expander outlet 4 and a bypass outlet 5, preferably designed as bored holes. The bypass valve 1 furthermore has a closing body 6, a spring 7 and a control valve 8. The closing body and the spring 7 are arranged in a valve chamber 9 which is formed in the housing 2. The housing 2 is preferably of multi-part design in this case so that the closing body 6, the spring 7 and the control valve 8 can be installed therein. Both the inlet 3 and the expander outlet 4 and the bypass outlet 5 open into the valve chamber 9. The control valve 8 can be of optional design in this case, for example as an electromagnetically operable slide valve or ball valve. In the embodiment of FIG. 2, the closing body 6 is designed as a ball.

If the bypass valve 1 is used in a waste heat recovery system 100 then the expander outlet 4 is connected to the expansion machine 104, for example a turbine, and the bypass outlet 5 is connected to the bypass line 106.

The bypass valve 1 has two valve seats, that is to say is designed as a 3/2 directional valve. One valve seat 11 is formed in the housing 2 between the inlet 3 and the expander outlet 4. In the embodiment of FIG. 2, the valve seat 11 is of conical shape and designed to encompass the expander outlet 4. The spring 7 presses the closing body 6 against the valve seat 11. If the closing body 6 interacts with the valve seat 11 then a first hydraulic connection from the inlet 3 via the valve chamber 9 to the expander outlet 4 is closed. As a rule, a second hydraulic connection from the inlet 3 via the control valve 8 and the valve chamber 9 to the bypass outlet 5 is opened at the same time, specifically through the open control valve 8.

With the first hydraulic connection closed, a linear contact between the closing body 6 and the housing 2 ideally occurs; this seating line is designated 11a in FIG. 2. In the embodiment of FIG. 2, a third hydraulic connection from the inlet 3 via the valve chamber 9 to the bypass outlet 5 is also opened. The second hydraulic connection and the third hydraulic connection are in the main connected in parallel. In alternative embodiments, the bypass valve 1 can also be designed without the third hydraulic connection.

A further valve seat 12 or a stop is formed in the housing 2 between the inlet 3 and the bypass outlet 5. If the closing body 6 interacts with the further valve seat 12 then the hydraulic connection from the inlet 3 via the valve chamber 9 to the expander outlet 4 is opened and the third hydraulic connection—if present—from the inlet 3 via the valve chamber 9 to the bypass outlet 5 is closed.

The bypass valve 1 has three restriction points: a first restriction point 21 is formed on the control valve 8, that is to say in the second hydraulic connection, a second restriction point 22 is formed downstream of the further valve seat 12 or of the control valve 8 and upstream of the bypass outlet 5, that is to say in the second and third hydraulic connections, and a third restriction point 23 is formed in the valve chamber 9 between the closing body 6 and the housing 2, that is to say in the third hydraulic connection. The first restriction point 21 can be controlled by the control valve 8 and can also be closed by this. The second restriction point 22 has a constant flow passage cross section A22. The third restriction point 23 is formed in the third hydraulic connection when the closing body 6 is in contact with the valve seat 11, providing a third hydraulic connection is present. If the closing body 6 is in contact with the further valve seat 12, then the third restriction point 23 is closed, however.

The first restriction point 21 and the third restriction point 23 form a parallel connection when the closing body 6 is in contact with the valve seat 11. The second restriction point 22 is downstream of this parallel connection. Depending on the connection of the control valve 8, the first restriction point 21 can in this case also be closed, however, so that fluidically in this state only a series connection consisting of the third restriction point 23 and second restriction point 22 exists, wherein this functionally constitutes only a brief transient state of the bypass valve 1.

Considered fluidically, a partial volume of the valve chamber 9 is designed as a control chamber 9a: the control chamber 9a is delimited by the housing 2, the control valve 8 or the first restriction point 21, the second restriction point 22, the closing body 6 and—if present—by the third restriction point 23. The control valve 8, particularly by the different flow passage cross sections of the first restriction point 21 and the second restriction point 22, now controls the pressure in the control chamber 9a. The pressure in the control chamber 9a acts in the main upon the region of the closing body 6 which is on the left in FIG. 2. Ultimately, the control valve 8 therefore controls the hydraulically resulting force upon the closing body 6.

Figure 3:
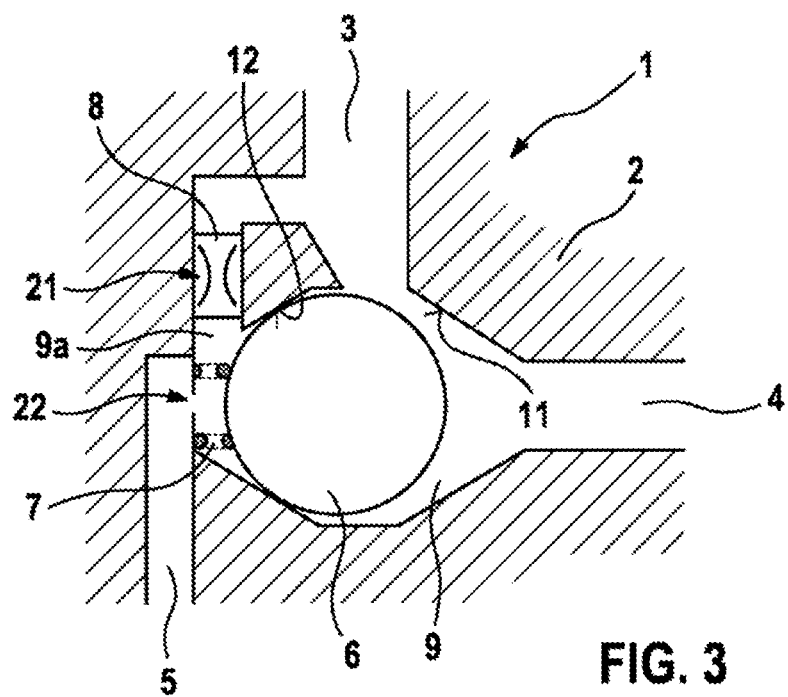
FIG. 3 shows the bypass valve in a second valve position.

FIG. 2 shows the bypass valve 1 according to the invention with the first hydraulic connection closed and with the second and third hydraulic connections open, that is to say in bypass mode. FIG. 3 shows the same embodiment of the bypass valve 1 with the first hydraulic connection open and with the second and third hydraulic connections closed, that is to say in expander mode.

The bypass valve 1 is preferably constructed with the following dimensions:

Diameter of the closing body 6 designed as a ball: 25 mm

Diameter of the expander outlet 4: 15 mm

Flow passage cross section A21 of the first restriction point 21 with control valve 8 open: 30 $mm^2$ Flow passage cross section A22 of the second restriction point 22: 16 $mm^2$ Flow passage cross section A23 of the third restriction point 23 with first hydraulic connection closed: 8 $mm^2$ The bypass valve 1 functions as follows:

Via the pressure forces prevailing in the bypass valve 1 and the force of the spring 7, the closing body 6 is pushed into a respective bypass or expander position. The pressure forces are adjusted via the three restriction points 21, 22, 23, wherein the first restriction point 21 can be controlled via the control valve 8. The restriction points 21, 22, 23 have to be designed so that the flow passage cross section A21 of the first restriction point 21 is larger than the flow passage cross section A22 of the second restriction point 22 and this in turn is larger than the flow passage cross section A23 of the third restriction point 23: $A21>A22>A23$. In a continuation of the invention, the third restriction point 23 can be completely dispensed with in this case.

The bypass valve 1 is now initially in the bypass position, that is to say the closing body 6 butts against the valve seat 11 and so closes off the first hydraulic connection. The control valve 8 is open in this position since it is designed with a passive fail-safe function. Therefore, both the second hydraulic connection and the third hydraulic connection are open. The third hydraulic connection in this case includes the third restriction point 23 and the second restriction point 22, and the second hydraulic connection in this case includes the first restriction point 21 and the second restriction point 22.

The following pressure ratios result from this: the sum of the flow passage cross sections at the first restriction point 21 and the third restriction point 23, that is to say A21+A23, is significantly larger than the flow passage cross section A22 at the second restriction point 22; therefore the inlet pressure, that is to say the pressure of the inlet 3, is therefore established overall on the closing body 6 in the valve chamber 9—consequently also in the control chamber 9a. Therefore, the closing body 6 is pushed into the valve seat 11 by means of the force of the spring 7. Via the second restriction point 22, the pressure to the bypass outlet 5 is reduced as desired.

If there is now to be a changeover to expander mode, that is to say the first hydraulic connection is to be opened, then the control valve 8 has to be (actively) closed so that the first restriction point 21, and with it the second hydraulic connection, is closed. As a result, the following pressure ratios are established: via the third restriction point 23, which has a significantly smaller flow passage cross section than the second restriction point 22 (A23<A22), the pressure in the control chamber 9a falls below the pressure of the inlet 3; the control chamber 9a virtually runs dry through the second restriction point 22. The forces upon the region of the closing body 6 which is on the left in FIG. 2 in the direction of the valve seat 11 are significantly reduced as a result. Practically no forces from the expander outlet 4 act upon the right-hand region of the closing body 6, but outside the seating line 11a the high pressure of the inlet 3 acts in the direction away from the valve seat 11. As a result, the closing body 6 is pushed away from the valve seat 11 against the force of the spring 7 into the further valve seat 12 and retained in the further valve seat 12 by means of the pressure forces. The first hydraulic connection is then opened and the second hydraulic connection and the third hydraulic connection are closed.

If the control valve 8 or the second hydraulic connection is opened again, a pressure builds up again in the control chamber 9a between the closing body 6 and the second restriction point 22 since the flow passage cross section A21 through the first restriction point 21 is larger than the flow passage cross section A22 through the second restriction point 22. Assisted by the force of the spring 7, the closing body 6 is then displaced again into the valve seat 11 and in the process also opens the third hydraulic connection. At the same time, the first hydraulic connection is closed.

The bypass valve 1 according to the invention can therefore be actuated by means of a very small actuating force of the control valve 8. The displacement of the closing body 6 is subsequently carried out based on the ensuing pressure ratios. The control valve 8 can be designed in a correspondingly favorable manner. In general, the construction of the bypass valve 1 can be carried out in a very simple and cost-effective manner. Furthermore, the function of the bypass valve 1 is very robust since the restriction points 21, 22, 23 are not exposed to the risk of wear. The comparatively large pressure difference between the expander outlet 4 and the bypass outlet 5 when using the bypass valve 1 in a waste heat recovery system 100 is very advantageous for use of the bypass valve 1 according to the invention in just such a waste heat recovery system 100 since as a result greatly different forces upon two regions of the closing body 6 can be realized, which is essential for the functioning principle of the bypass valve 1.

The invention claimed is:

1. A bypass valve (1), comprising a housing (2) with a valve chamber (9) formed therein, wherein an inlet (3), an expander outlet (4) and a bypass outlet (5) are formed in the housing (2) and open into the valve chamber (9), wherein a closing body (6) is movably arranged in the valve chamber (9), wherein a valve seat (11) is formed in the housing (2), wherein the closing body (6) interacts with the valve seat (11) for the opening and closing of a first hydraulic connection from the inlet (3) to the expander outlet (4), wherein a control valve (8) opens and closes a second hydraulic connection from the inlet (3) to the bypass outlet (5), wherein in an open position the control valve (8) forms a first restriction point (21), wherein a second restriction point (22) is arranged between the valve chamber (9) and the bypass outlet (5), wherein the control valve (8), the second restriction point (22) and the closing body (6) delimit a control chamber (9a), and wherein the first restriction point (21) has a larger flow passage cross section than a flow passage cross section of the second restriction point (22).

2. The bypass valve (1) as claimed in claim 1, characterized in that a spring (7) acts upon the closing body (6) in a direction of the valve seat (11).

3. The bypass valve (1) as claimed in claim 1, characterized in that the closing body (6) is a ball.

4. The bypass valve (1) as claimed in claim 1, characterized in that the valve seat (11) is arranged in a manner encompassing the expander outlet (4).

5. The bypass valve (1) as claimed in claim 1, characterized in that with the first hydraulic connection closed, a third restriction point (23) is formed in the valve chamber (9) between the closing body (6) and the housing (2).

6. The bypass valve (1) as claimed in claim 5, characterized in that a flow passage cross section through the third restriction point (23) is smaller than the flow passage cross section through the second restriction point (22).

7. A waste heat recovery system (100) comprising a bypass valve as claimed in claim 1, the waste heat recovery system (100) having a circuit (100a) conducting a working medium, wherein, in a flow direction of the working medium, the circuit (100a) comprises a pump (102), an evaporator (103), the bypass valve (1), an expansion machine (104) and a condenser (105), wherein a bypass line (106) is arranged in parallel with the expansion machine (104) and wherein the bypass valve (1) controls a mass flow of the working medium to the expansion machine (104) and to the bypass line (106).

8. The waste heat recovery system (100) as claimed in claim 7, characterized in that a spring (7) acts upon the closing body (6) in a direction of the valve seat (11).

9. The waste heat recovery system (100) as claimed in claim 7, characterized in that the closing body (6) is a ball.

10. The waste heat recovery system (100) as claimed in claim 7, characterized in that the valve seat (11) is arranged in a manner encompassing the expander outlet (4).

11. The waste heat recovery system (100) as claimed in claim 7, characterized in that with the first hydraulic connection closed, a third restriction point (23) is formed in the valve chamber (9) between the closing body (6) and the housing (2).

12. The waste heat recovery system (100) as claimed in claim 11, characterized in that a flow passage cross section through the third restriction point (23) is smaller than the flow passage cross section through the second restriction point (22).

\* \* \* \* \*